US006556377B2

(12) United States Patent
Chen et al.

(10) Patent No.: US 6,556,377 B2
(45) Date of Patent: Apr. 29, 2003

(54) STITCHED WRITE HEAD DESIGN HAVING A SUNKEN SHARED POLE

(75) Inventors: Mao-Min Chen, San Jose, CA (US); Po-Kang Wang, San Jose, CA (US); Cherng-Chyi Han, San Jose, CA (US)

(73) Assignee: Headway Technologies, Inc., Milpitas, CA (US)

( * ) Notice: Subject to any disclaimer, the term of this patent is extended or adjusted under 35 U.S.C. 154(b) by 0 days.

(21) Appl. No.: 10/236,580

(22) Filed: Sep. 6, 2002

(65) Prior Publication Data

US 2003/0002212 A1 Jan. 2, 2003

Related U.S. Application Data

(62) Division of application No. 09/525,672, filed on Mar. 15, 2000, now Pat. No. 6,469,875.

(51) Int. Cl.[7] .............................................. G11B 5/147
(52) U.S. Cl. ....................................... 360/126; 360/317
(58) Field of Search ................................. 360/317, 126

(56) References Cited

U.S. PATENT DOCUMENTS

| | | | |
|---|---|---|---|
| 4,875,987 A | 10/1989 | Wada et al. ............ 204/192.15 |
| 5,875,080 A | 2/1999 | Seagle ........................ 360/123 |
| 5,935,644 A | 8/1999 | Heim et al. .................. 427/116 |
| 6,130,809 A | * 10/2000 | Santini ........................ 360/317 |
| 6,338,939 B1 | * 1/2002 | Clarke ..................... 29/603.14 |

* cited by examiner

Primary Examiner—A. J. Heinz
(74) Attorney, Agent, or Firm—George O. Saile; Stephen B. Ackerman; William J. Stoffel

(57) ABSTRACT

A structure and a method for a stitched write head having a sunken share pole. The method includes forming a bottom coil dielectric layer over the first half shared pole. Coils are formed over the bottom coil dielectric layer. Next, second half shared poles (P1) are formed over the first half shared pole (S2). We form a top coil dielectric layer over the structure. In a key step, we chemical-mechanical polish the top coil dielectric layer. A write gap layer (WG) is formed over the front second half shared pole and the top coil dielectric layer over the coils. An upper pole (P3) and hard mask are formed over the write gap layer. We etch the write gap layer and the second half shared pole (P1) using the upper pole as an etch mask to remove a portion of the second half shared pole (P1) adjacent to the write gap layer thereby forming a partially trimmed pole.

14 Claims, 4 Drawing Sheets

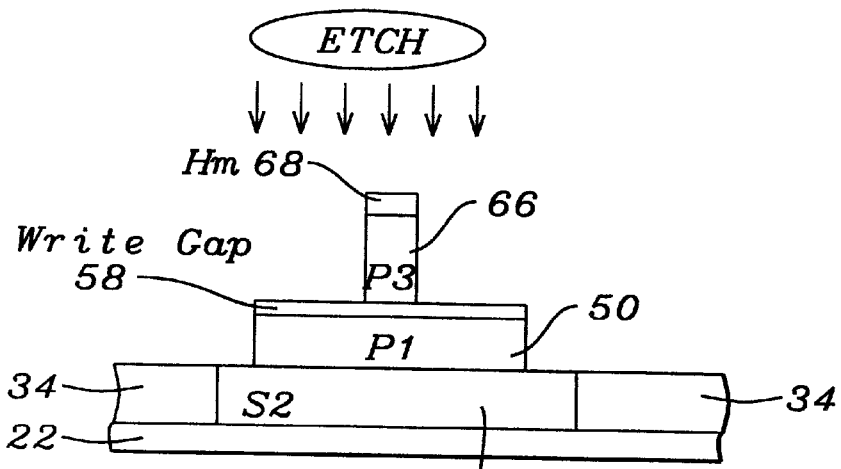
FIG. 8A
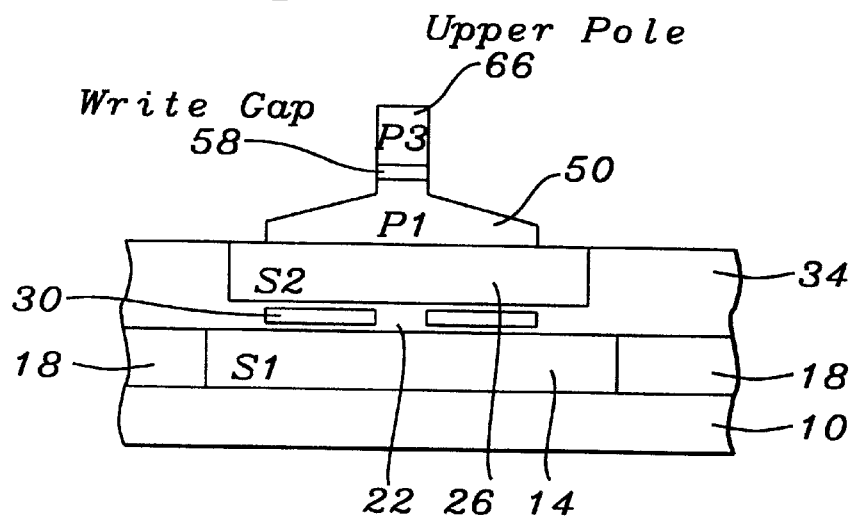
FIG. 8B
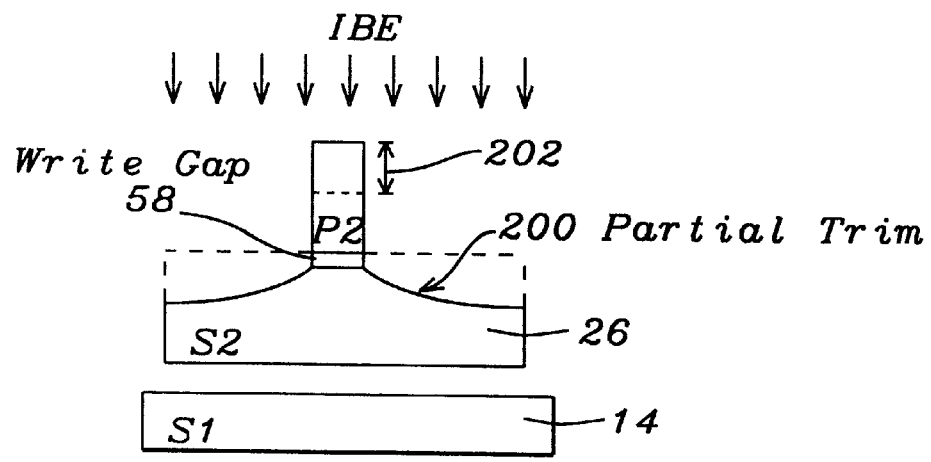
FIG. 9A - Prior Art

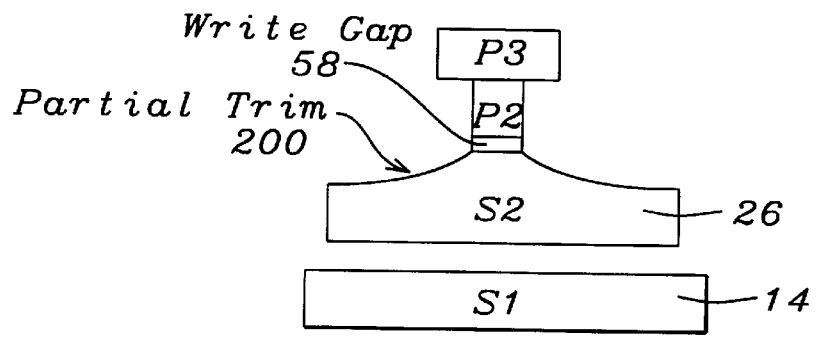
FIG. 9B – Prior Art
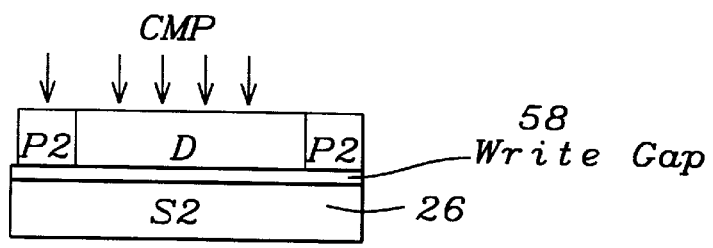
FIG. 10A – Prior Art
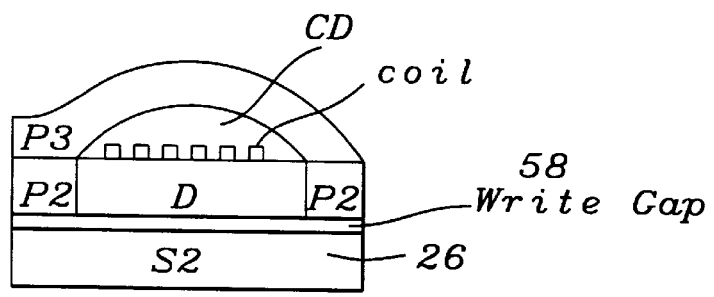
FIG. 10B – Prior Art

STITCHED WRITE HEAD DESIGN HAVING A SUNKEN SHARED POLE

This is a division of patent application Ser. No. 09/525,672, filing date Mar. 15, 2000, now U.S. Pat. No. 6,469,875, A Stitched Write Head Design Having A Sunken Shared Pole, assigned to the same assignee as the present invention.

BACKGROUND OF INVENTION

1) Field of the Invention

This invention relates generally to fabrication of magnetoresistive (MR) heads and more particularly to the fabrication and structure of write heads for magnetoresistive (MR) head and more particularly to the fabrication of a write head using a stitched structure/process and a sunken share pole.

2) Description of the Prior Art

As the magnetic disk drive technology advances, the write gap widths must be reduced. Several processes have been developed to reduce write head size and improve manufacturing processes. The stitched head and partial pole trim processes are processes where the write poles are formed in separate deposition steps.

A challenge to producing narrower write gap widths is to use thinner upper pole layers with the partial pole trim processes.

The importance of overcoming the various deficiencies noted above is evidenced by the extensive technological development directed to the subject, as documented by the relevant patent and technical literature. The closest and apparently more relevant technical developments in the patent literature can be gleaned by considering U.S. Pat. No. 5,875,080 (Seagle) that discloses a write head process with a pole trim step and a process for forming a second set of coils over the second pole.

U.S. Pat. No. 5,935,644 (Heim et al.) shows a zero throat height of a write head by recessing the first insulation layer within the first pole piece.

U.S. Pat. No. 4,875,987 (Wada et al.) shows a grooved substrate where the coils are formed over the groove for a magnetic head.

However, these further improvement is required

SUMMARY OF THE INVENTION

It is an object of the present invention to provide a structure and method for fabricating a write head which can over come the high aspect ratio limitations of photographic techniques for defining the upper pole (P3).

It is an object of the present invention to provide a structure and a method for write head that has a sunken shared pole (S1 and P1) that has a reduce thickness that reduces the aspect ratio.

It is an object of the present invention to provide a method for fabricating a write head that uses chemical-mechanical polish steps to planarize dielectric layers.

To accomplish the above objectives, the present invention provides a structure and a method of manufacturing a write head having a sunken share pole which is characterized as follows. The method includes forming a bottom coil dielectric layer over the first half shared pole. Coils are formed over the bottom coil dielectric layer. Next, second half shared poles (P1) are formed over the first half shared pole (S2). We form a top coil dielectric layer over the structure. In a key step, we chemical-mechanical polish the top coil dielectric layer. A write gap layer (WG) is formed over the front second half shared pole and the top coil dielectric layer over the coils. An upper pole (P3) and hard mask are formed over the write gap layer. We etch the write gap layer and the second half shared pole (P1) using the upper pole as an etch mask to remove a portion of the second half shared pole (P1) adjacent to the write gap layer thereby forming a partially trimmed pole.

Additional objects and advantages of the invention will be set forth in the description that follows, and in part will be obvious from the description, or may be learned by practice of the invention. The objects and advantages of the invention may be realized and obtained by means of instrumentalities and combinations particularly pointed out in the append claims.

BRIEF DESCRIPTION OF THE DRAWINGS

The features and advantages of a semiconductor device according to the present invention and further details of a process of fabricating such a semiconductor device in accordance with the present invention will be more clearly understood from the following description taken in conjunction with the accompanying drawings in which like reference numerals designate similar or corresponding elements, regions and portions and in which.

FIGS. 1, 2, 3, 4, 5, 6, 7, 8A and 8B cross sectional views for illustrating a structure and a method for forming a write head according to the present invention.

FIGS. 8A and 8B are air bearing surface (ABS) views for illustrating the structure and method of the present invention.

FIGS. 9A and 9B are air bearing surface (ABS) views for a write head process known by the inventors upon which the present invention is an improvement over.

FIGS. 10A and 10B are cross sectional views for a write head process known by the inventors upon which the present invention is an improvement over.

DETAILED DESCRIPTION OF THE PREFERRED EMBODIMENTS

A. The Problem the Invention Solves

Figure 1:
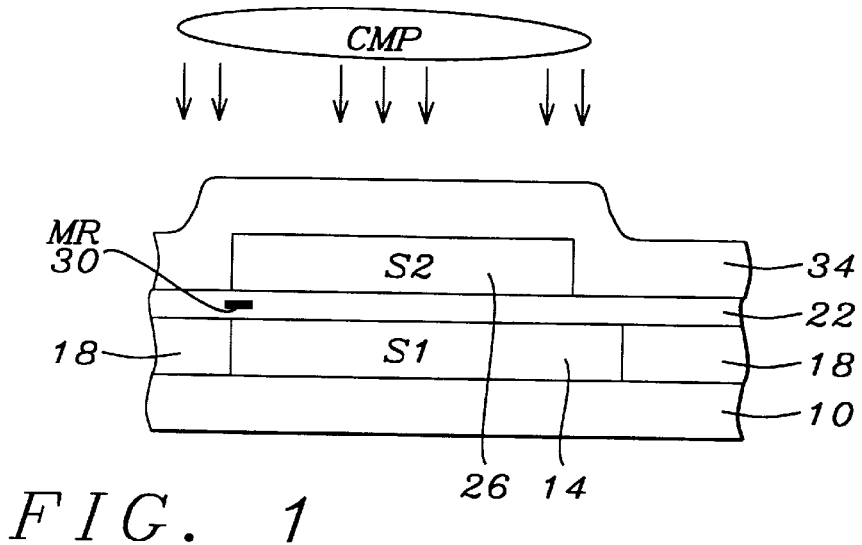

Referring now to the drawing and more particularly to FIGS. 9A, 9B, 10A and 10B, there is shown an air bearing surface (ABS) view of a head structure over which the present invention is an improvement. It is to be understood in this regard that no portion of FIGS. 9A, 9B, 10A and 10B, is admitted to be prior art to the present invention. Rather, this highly simplified diagram is an effort to provide an improved understanding of the problems that are overcome by the invention.

FIG. 9A shows a bottom Shared pole (S1), a top shared pole (S2), a write gap (WG), a top P2 pole and a top P3 pole. A major problem with this design is that the P2 pole must be very thick prior to the ion beam etch (IBE) that uses the P2 as an etch mask to IBE etch the partial trim 200 in the S2.

FIG. 9A shows the partial pole trim etch (PPT) (e g, IBE etch) that defines trims the bottom pole (see area 200), the write gap and the upper pole (P2). The dashed lines represent the Shared pole S2 before the ion beam etch (IBE). In the ion beam etch (IBE) a height the P2 is etched away. This extra height 202 causes problems in accurately patterning the Pole (e.g., mushroom pole profile). This extra height increases the aspect ratio of the second pole (P2).

Referring to FIG. 10A, a dielectric layer (D) is formed over the WG and the P2. As shown in FIG. 10A, a chemical-mechanical polish (CMP) is used to planarize the D layer Unfortunately, the CMP removes some of the P2.

FIGS. 9B and 10B show the completed head with the P3 layer formed over the P2. After the P2 IBE etch, and D layer CMP, coils and a coil dielectric layer (CD) are formed. Next, P3 layer is formed over the coil dielectric layer (CD) and P2. The P2 and P3 form the upper pole of the write head.

Also, as the future requirements of the write gap width decrease, say to 0.25 μm wide, the aspect ratio increases: for example, the P2 thickness requirement=final P2 thickness (1.5 μm)+ Partial Pole trim P2 consumption (1.5 μm) and CMP consumption of P2 (0.5 μm)=about 3.5 μm.

Therefore, the aspect ratio is=height/width=3.5 μm/0.25= 14:1. Because of this high aspect ratio requirement, there needs to be a new method to perform head stitching that reduces the write upper pole aspect ratio so that thinner write gap widths can be achieved in the future.

B. Invention Uses a Sunken Shared Pole to Reduce Upper Pole (P3) Thickness

FIGS. 1 to 8B shows a preferred embodiment of the invention of a method of fabricating a stitched write head having a sunken share pole. The term "sunken shared pole" comes from the configuration of the invention's S1 and P1 layers that comprise the shared pole. The write gap 58 (WG) is over the shared pole (S2 (26) and P1 (50)) (See FIG. 8) and therefore the shared pole (S2 & P1) is referred to as sunken. Compared to the process known to the inventors (See FIG. 10B), the invention's S1 and P1 are sunken. The invention's coils are also "sunken" so that the coils are in the same plane as the P1 layers The method and structure are described below.

Referring to FIG. 1, we form an undercoat dielectric layer 10 over a substrate (not shown, up under the undercoat dielectric layer) The undercoat dielectric layer 10 can be formed on any conventional material such as alumina, or SiC.

C. Form a Bottom Shield (S1) 14 Over the Undercoat Dielectric Layer 10

Next, we form a bottom shield (S1) 14 over the undercoat dielectric layer 10. The bottom shield layer (S1) 14 is deposited and patterned using conventional patterning techniques. The bottom shield layer is preferably comprised of NiFe (e.g., Ni45Fe55), $Ni_{80}Fe_{20}$ or laminated NiFe/Ta.

D. Form a Bottom Shield Dielectric Layer 18

Still referring to FIG. 1, a bottom shield dielectric layer 18 is formed over the bottom shield (S1) 14 and the undercoat layer 10. The bottom shield layer 18 is preferably deposited by a sputter deposit method. The bottom shield layer 18 is preferably composed of Alumina or $SiO_2$ and most preferably is composed of Alumina.

E. Chemical-Mechanical Polishing the Bottom Shield Dielectric Layer 18

In a key step, we chemical-mechanical polish the bottom shield dielectric layer 18 to make the bottom shield dielectric layer 18 co-planar with the bottom shield 14. This is a critical step because it make the subsequent layers planar and reduce the aspect ratio for the P2.

F. Form a Read Gap Dielectric 22 and MR Sensor 30

Next, we form a read gap dielectric 22 and MR sensor 30 structure over the bottom shield dielectric layer 18 and the bottom shield 14. The read gap dielectric layer surrounding the MR sensor. The read gap dielectric layer is preferably a multiple layer structure such as a bottom read gap layer and a top read gap layer overlying the MR sensor and the bottom read gap layer.

The MR sensor is preferably a giant magnetoresistance (GMR) sensor, but can be other conventional MR sensors.

G. FIG. 1—Form a First Half Shared Pole 26 (S2)

Still referring to FIG. 1, we form a first half shared pole 26 (S2) over the read gap dielectric 22. The first half shared pole 26 (S2) is preferably sputter deposited. The first half shared pole layer 26 is patterned preferably by a formed by a photoresist and etch process.

Figure 2:
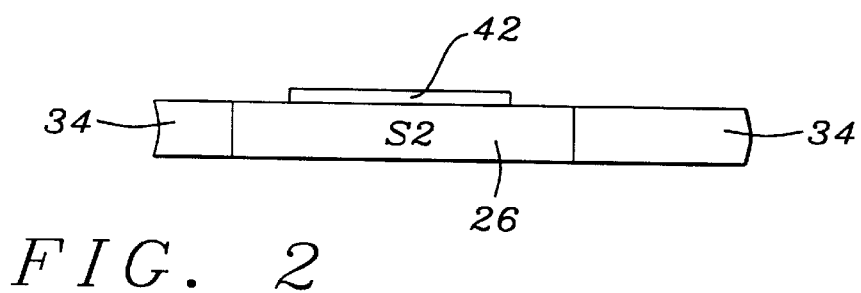

H. FIGS. 1 & 2—Form a Shared Pole Dielectric Layer 34

As shown in FIGS. 1 & 2, we form a shared pole dielectric layer 34 over the gap dielectric layer 22 and the first half shared pole 26 (S2) The share pole dielectric layer 34 is preferably formed by a sputter process and is preferably composed of alumina ($Al_2O_3$). The share pole dielectric layer 34 preferably has a thickness (before CMP) of between about 3.0 and 6.0 μm.

I. CMP the Shared Pole Dielectric Layer 34 and the First Half Shared Pole 26 (S2)

Still referring to FIGS. 1 & 2, in a critical step, we chemical-mechanical polish the shared pole dielectric layer 34 and the first half shared pole 26 (S2) to make the shared pole dielectric layer 34 and coplanar the first half shared pole 26 (S2). It is critical that the shared pole dielectric layer 34 and the first half shared pole 26 (S2) are coplanar.

J. FIG. 2—Forming a Bottom Coil Dielectric Layer 42

As shown in FIG. 2, we next form a bottom coil dielectric layer 42 over the first half shared pole 26. The bottom coil dielectric layer is preferably sputter deposited and patterned. The bottom coil dielectric layer preferably is composed of $Al_2O_3$ or $SiO_2$ and preferably has a thickness of between about 2000 and 5000 Å

Figure 3:
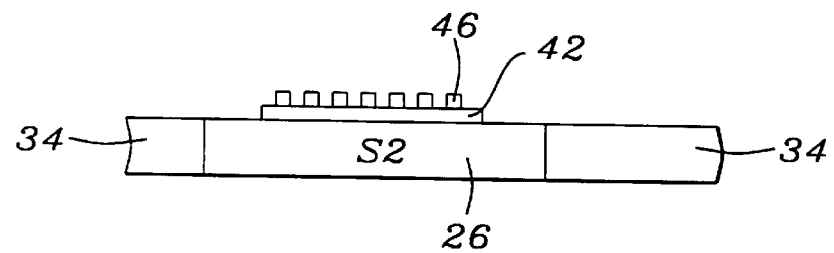

K. FIG. 3—Form Coils 46

As shown in FIG. 3, we form coils 46 over the bottom coil dielectric layer 42. The coils are preferably formed by an electroplating process and preferably are composed of Cu material. The coils 46 preferably have a thickness of between about 1.0 and 3.0 μm. The coils are preferably helical shaped when viewed from a top down view.

Figure 4:
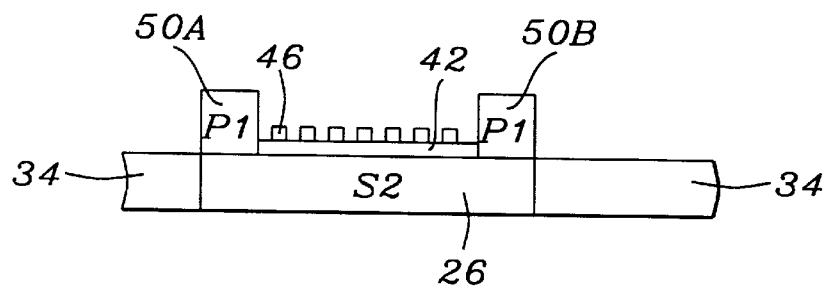

L. FIG. 4—Forming Second Half Shared Poles 50 (P1)

As shown in FIG. 4, we form second half shared poles (P1) over the first half shared pole 26 (52). The second half shared poles (P1) are comprised of a front second half shared pole 50A and a back second half shared pole 50B.

To form the front second half shared pole 50A and a back second half shared pole 50B, we deposit a second half shared poles 50 (P1) layer (not shown) and then patterned using a photolithography and etch process. Alternatively, the front second half shared pole 50A and a back second half shared pole 50B are plated using a frame plating technique.

The front second half shared pole 50A and a back second half shared pole 50B are preferably composed of (what materials) NiFe, or CoNiFe. The poles can be composed of high moment materials such as Ni45Fe55, or CoNiFe.

Figure 5:
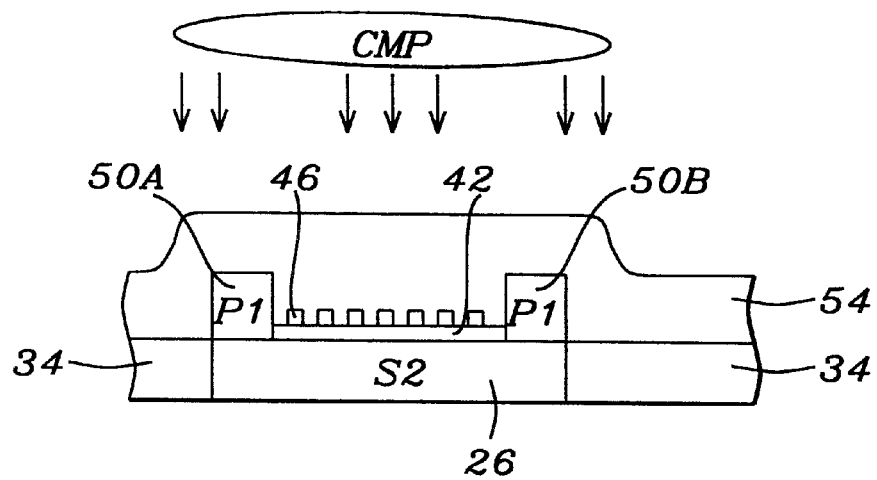

M. FIG. 5—Form a Top Coil Dielectric Layer 54

As shown in FIG. 5, we form a top coil dielectric layer 54 over the bottom coil dielectric layer 42, the coils 46 and the shared pole dielectric layer 34. The top coil dielectric layer 54 is preferably composed of alumina or hard baked photoresist. The top coil dielectric layer preferably has a thickness of between about 2.0 and 4.0 μm.

N. CMP the Top Coil Dielectric Layer 54

Figure 6:
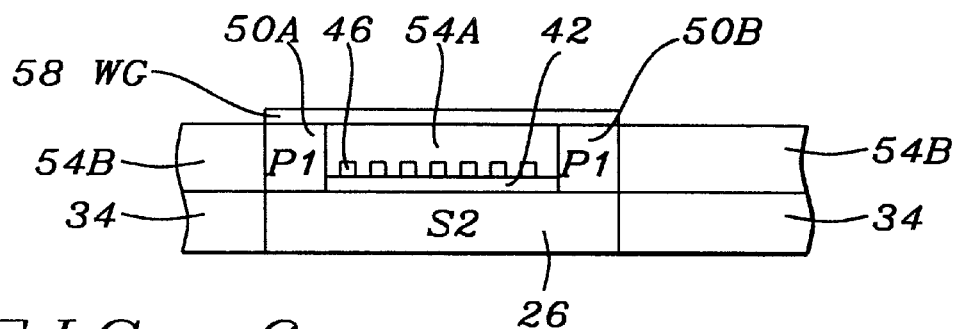

In a critical step, as shown in FIG. 6, we planarize (preferably by chemical-mechanical polishing (CMP)), the top coil dielectric layer 54 and the second half shared poles 50A 50B to make the top coil dielectric layer 54 (54A 54B) about coplanar with the second half shared poles 50A 50B (P1).

Other planarization processes that can be used in addition to CMP, such as RIE etchback. However, these are not as efficient as chemical-mechanical polish.

O. FIG. 6—Form a Write Gap Layer 58 (WG)

Still referring to FIG. 6, we then form a write gap layer 58 (WG) over the front second half shared pole 50A and the top coil dielectric layer 54A over the coils 46. The write gap layer is preferably composed of Alumina, or $SiO_2$ and preferably has a thickness of between about 1000 and 3000 Å.

Figure 7:
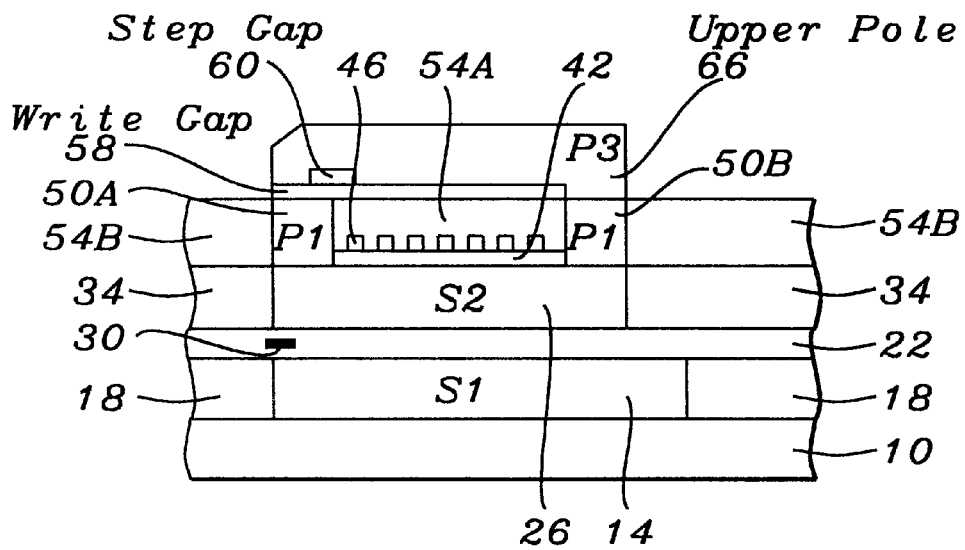

P. FIG. 7—Form a Upper Pole (P3)

Referring to FIG. 7, we form a upper pole (P3) over the write gap layer 58. The upper pole layer is preferably plated deposited over the write gap layer 58 and the second half shared poles (P1). The upper pole (P3) is preferably composed of NiFe (e.g., $Ni_{45}Fe_{55}$) and preferably has a thickness of between about 1.4 and 4.0 µm and more preferably between 1.5 and 2.9 µm.

Q. FIG. 8A—Form an Alumina Hard Mask Over Upper Pole

As shown in FIG 8A, a mask layer 68 (HM) is formed over the upper pole. Most preferably the mask is a hard mask such as alumina. The masking layer can be formed of any masking material such as a hard mask material of alumina or a photoresist material. The hard mask layer is patterned using conventional photolithography to form a hard mask that defines the upper pole (P3). The hard mask 68 is then used as a IBE hard mask in the subsequent Ion Beam etch (IBE) that defines the upper pole, write gap 58 and partial trim P1 (50). The hard mask is preferably composed of alumina so that one can take advantage of the high selectivity of the ion beam etch ratio between the upper pole and the alumina hard mask. Since thinner alumina is used to replace the conventional resist mask, less shadowing effect and high pole trimming efficiency is achieved with the invention's alumina hard mask. Therefore, thinner upper poles (P3) can be used to define the trimmed lower pole. See FIG 8B.

The hard mask 68 preferably has a thickness of between about 3000 and 6000 Å and more preferably between 4000 and 5000 Å. In contrast, a conventional photoresist mask has a thickness of between about 2.0 and 3.00 µm. Therefore the invention's hard mask is much thinner and allows better Pole with control in the photo and IBE processes (e.g., lower aspect ratio).

R. FIG. 8A—Etching the Write Gap Layer 58 and the Second Half Shared Pole 50 (P1)

As shown in FIGS. 8A and 8B, we etch the write gap layer 58 and the second half shared pole 50 (P1) using the hard mask (HM) 68 and upper pole 66 as an etch masks to remove a portion of the second half shared pole 50 (P1) adjacent to the write gap layer 58 thereby forming a partially trimmed pole.

FIG. 8B shows an air bearing surface (ABS) view of the head after the IBE and the removal of the hard mask.

S. Benefits-Reduced Aspect Ratio

The invention reduces the required thickness of the upper pole (P3) layer. The invention's initial P3 layer thickness is only (a) designed PPT P3 thickness and the amount of P3 that is IBE away in any the PPT process.

For example, initial P3 thickness=final p3 design (1.5 µm) and the P2 consumed in the PPE (0.5 µM) therefore the initial P3 thickness=2 µm. Therefore, the P3 aspect ratio is (1.5 µm+0.5 µm)/0.25 m=2/0.25=8.1. This contrasts with the inventor's prior process that had an P2 aspect ratio of 14:1. See above.

T. Device Structure

The invention include a device structure of a write head having a sunken share pole comprising:

See FIG. 1—an undercoat dielectric layer 10 over a substrate;

a bottom shield (S1) 14 over said undercoat dielectric layer 10;

a bottom shield dielectric layer 18 over said bottom shield (S1) 14 and said undercoat layer 10;

the bottom shield dielectric layer 18 co-planar with said bottom shield 14;

a read gap dielectric 22 and MR sensor 30 over said bottom shield dielectric layer 18 and said bottom shield 14; said read gap dielectric layer surrounding said MR sensor, a first half shared pole 26 (S2) over said read gap dielectric 22;

a shared pole dielectric layer 34 over said gap dielectric layer; said shared pole dielectric layer 34 coplanar with said first half shared pole 26 (S2);

FIG. 2—a bottom coil dielectric layer 42 over said first half shared pole 26;

FIG. 3 coils 46 over said bottom coil dielectric layer 42;

FIG. 4—a front second half shared pole 50A (P1) over said first half shared pole 26 (52), a back second half shared pole SOB over a portion of over said first half shared pole 26;

FIG. 5—a top coil dielectric layer 54 over said bottom coil dielectric layer 42, said coils 46 and said shared pole dielectric layer 34;

FIG. 6—said top coil dielectric layer 54 (54A 54B) coplanar with said second half shared poles 50 (P1);

FIG. 6—a write gap layer 58 (WG) over said front second half shared pole 50A and said top coil dielectric layer 54A over said coils 46; and FIG. 7—an upper pole (P3) over said write gap layer 58.

While the invention has been particularly shown and described with reference to the preferred embodiments thereof, it will be understood by those skilled in the art that various changes in form and details may be made without departing from the spirit and scope of the invention. It is intended to cover various modifications and similar arrangements and procedures, and the scope of the appended claims therefore should be accorded the broadest interpretation so as to encompass all such modifications and similar arrangements and procedures.

What is claimed is:

1. A write head having a sunken share pole comprising:
    a) a bottom coil dielectric layer over said first half shared pole over a substrate;
    b) coils over said bottom coil dielectric layer;
    c) a front second half shared pole over said first half shared pole; a back second half shared pole over a portion of said first half shared pole;
    d) a top coil dielectric layer over said bottom coil dielectric layer, said coils;
    e) said top coil dielectric layer being coplanar with said front second half shared pole and said back second half shared pole;
    f) a write gap layer over said front second half shared pole and said top coil dielectric layer over said coils; and
    g) an upper pole over said write gap layer.

2. The write head of claim 1 wherein said bottom coil dielectric layer is composed of Alumina or $SiO_2$ and has a thickness between 2000 and 5000 Å.

3. The write head of claim 1 wherein said top coil dielectric layer is composed of Alumina and has a thickness between 2 and 4 µm.

4. A write head having a sunken share pole comprising:
    a) an undercoat dielectric layer over a substrate;

b) a bottom shield over said undercoat dielectric layer;

c) a bottom shield dielectric layer over said bottom shield and said undercoat layer;

d) the bottom shield dielectric layer co-planar with said bottom shield;

e) a read gap dielectric and MR sensor over said bottom shield dielectric layer and said bottom shield; said read gap dielectric layer surrounding said MR sensor;

f) a first half shared pole over said read gap dielectric;

g) a shared pole dielectric layer over said gap dielectric layer; said shared pole dielectric layer coplanar with said first half shared pole;

h) a bottom coil dielectric layer over said first half shared pole; said first half share pole is comprised of a first layer;

i) coils over said bottom coil dielectric layer;

j) a front second half shared pole over said first half shared pole; a back second half shared pole over a portion of over said first half shared pole; said front second half shared pole and said back second half shared pole are comprised of a second layer;

said first layer and said second layer are different layers;

k) a top coil dielectric layer over said bottom coil dielectric layer, said coils and said shared pole dielectric layer;

l) said top coil dielectric layer being coplanar with said front second half shared pole and said back second half shared pole;

m) a write gap layer over said front second half shared pole and said top coil dielectric layer over said coils; and n) an upper pole over said write gap layer.

5. The write head of claim 4 wherein said MR sensor is a giant magnetoresistance (GMR) sensor.

6. The write head of claim 4 wherein said bottom shield layer is composed of Alumina.

7. The write head of claim 4 wherein said bottom coil dielectric layer is composed of Alumina or $SiO_2$ and has a thickness between 2000 and 5000 Å.

8. The write head of claim 4 wherein said top coil dielectric layer is composed of Alumina and has a thickness between 2 and 4 $\mu m$.

9. A write head having a sunken share pole comprising:

a) a bottom coil dielectric layer over said first half shared pole over a substrate; said first half share pole is comprised of a first layer;

b) coils on said bottom coil dielectric layer;

c) a front second half shared pole over said first half shared pole; a back second half shared pole over a portion of said first half shared pole; said front second half shared pole and said back second half shared pole are comprised of a second layer;

said first layer and said second layer are different layers;

d) only a single top coil dielectric layer over said bottom coil dielectric layer, and said coils;

e) said top coil dielectric layer being coplanar with said front second half shared pole and said back second half shared pole;

f) a write gap layer over said front second half shared pole and said top coil dielectric layer over said coils; and g) an upper pole over said write gap layer.

10. The write head of claim 9 wherein said coils are co-planar.

11. The write head of claim 9 wherein all said coils are coplanar, said coils being on one level on said bottom coil dielectric layer.

12. A write head having a sunken share pole comprising:

a) an undercoat dielectric layer over a substrate;

b) a bottom shield on said undercoat dielectric layer;

c) a bottom shield dielectric layer on said bottom shield and said undercoat layer;

d) the bottom shield dielectric layer co-planar with said bottom shield;

e) a read gap dielectric and MR sensor over said bottom shield dielectric layer and said bottom shield; said read gap dielectric layer surrounding said MR sensor;

f) a first half shared pole on said read gap dielectric;

g) a shared pole dielectric layer on said gap dielectric layer; said shared pole dielectric layer coplanar being with said first half shared pole;

h) a bottom coil dielectric layer on said first half shared pole; said first half share pole is comprised of a first layer;

i) coils on said bottom coil dielectric layer;

j) a front second half shared pole on said first half shared pole; a back second half shared pole over a portion of on said first half shared pole; said front second half shared pole and said back second half shared pole are comprised of a second layer;

said first layer and said second layer are different layers;

k) a top coil dielectric layer over said bottom coil dielectric layer, said coils and said shared pole dielectric layer;

l) said top coil dielectric layer being coplanar with said front second half shared pole and said back second half shared pole;

m) a write gap layer on said front second half shared pole and said top coil dielectric layer and over said coils; and n) an upper pole on said write gap layer.

13. The write head of claim 12 wherein said coils are co-planar.

14. The write head of claim 12 wherein all said coils are coplanar, all said coils being on one level, all said coils being on said bottom coil dielectric layer.

* * * * *